Sept. 2, 1969  E. F. MASON  3,464,193
BAR PIVOT FOR COTTON HARVESTING MACHINE
Filed June 2, 1967
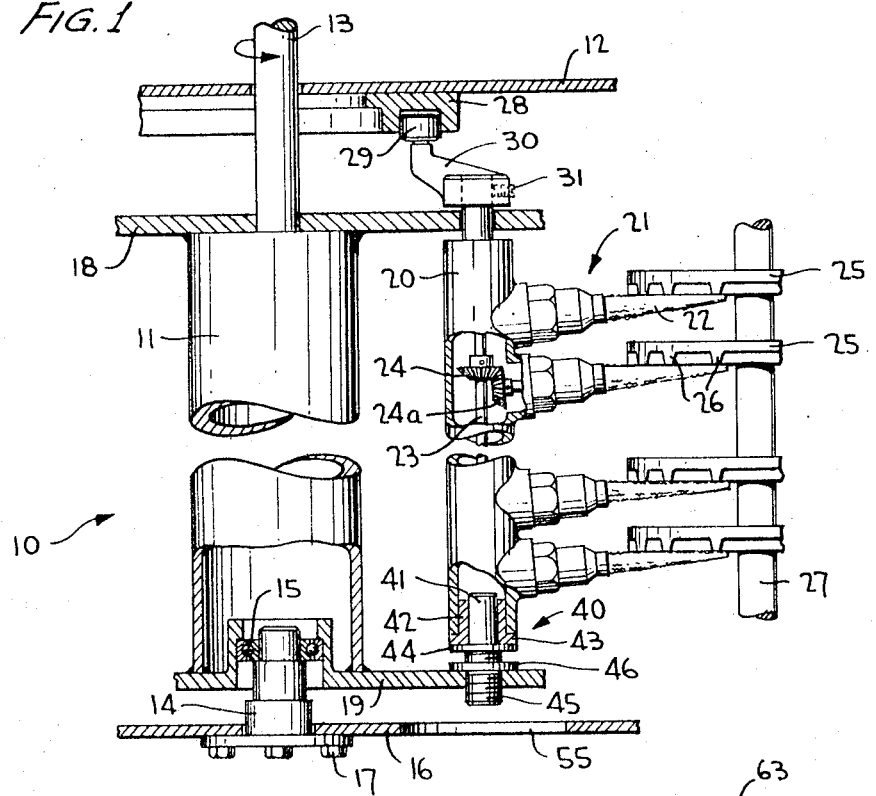
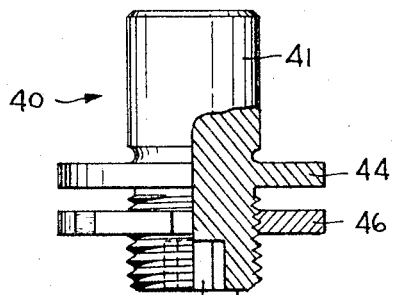
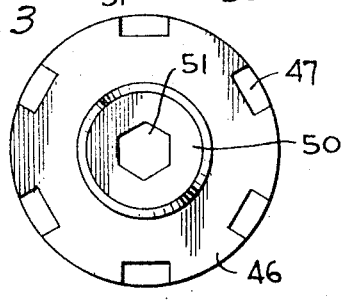
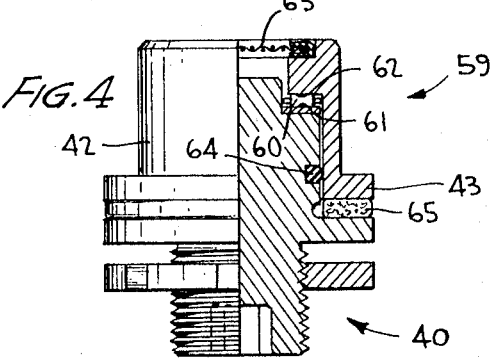
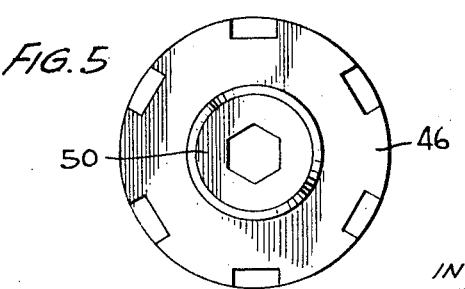
INVENTOR,
EVERETT F. MASON
BY
Watson, Cole, Grindle & Watson
ATTORNEYS

United States Patent Office 3,464,193
Patented Sept. 2, 1969

3,464,193
BAR PIVOT FOR COTTON HARVESTING MACHINE
Everett F. Mason, 415 N. Cornell St., Greenville, Miss. 38701
Filed June 2, 1967, Ser. No. 643,148
Int. Cl. A01d 45/18
U.S. Cl. 56—47          10 Claims

ABSTRACT OF THE DISCLOSURE

An adjustable support for setting the operating relationship between the rotating spindles and doffing means of a cotton harvesting machine which includes an upright threaded shaft for threadedly engaging the frame of the machine and locking means for setting the adjusted position. In an alterntaive embodiment a roller bearing is utilized for larger loads which bearing is supplied with lubricating oil from the excess in the spindle driving system.

---

The present invention relates to cotton harvesting machines and, more particularly, to improved support means for relative adjustment between the rotating spindles that collect the cotton and the doffer plates which remove it from said spindles for collection.

As is well known in the art, cotton harvesting machines or pickers conventionally employ a series of vertical support bars, each of which carries a plurality of horizontally extending spindles that rotate and gather the cotton on their roughened surface as the machine moves along the rows. The spindle bars are in turn mounted on a continuously rotating drum so that the spindle support bars are periodically brought into the housing of the machine where each is engaged by its corresponding doffer plate so as to remove and collect the cotton. During the use of the machine, the critical alignment between the depending wipers of the doffer plates and the rotating spindles may suffer. This is usually due to such factors as normal wear of the bearing surfaces and warping or slight bending of the frame that might occur from the usual jolting and bumping action which inevitably occurs in all agriculture equipment designed to travel along the ground. When the disturbance of this critical relationship occurs, either an abnormal wearing of the parts results and/or a loss in removal efficiency occurs so that the spindles and doffer plates must be removed from the machine, repaired, placed back in the machine, and readjusted relative to each other before the cotton picking operation can resume. This downtime of the machine is, of course, highly detrimental and costly in that the cotton must be harvested within a relatively limited period or be lost and one machine must be capable of picking a large quantity of cotton to be economical. Thus, it would be highly desirable to be able to accurately and quickly readjust the spindles in relation to the doffer plates in the field to forestall any detrimental wear and loss of efficiency.

Thus, it is one object of the present invention to provide an improved mechanism for use in cotton harvesting machines for adjusting the relationship between the doffer plates and the spindles.

It is another object of the present invention to provide an improved apparatus for the stated purpose which is capable of being easily adjusted in the field by inexperienced operators.

Another object of the invention is to provide an apparatus which is simple in construction, and accordingly low in cost so that it is especially adapted for use on the individual spindle bars.

Briefly, the apparatus of the present invention includes an upright stub-like shaft which forms a pivot support for one or more of the parts to be adjusted relative to each other. In accordance with the invention, threads on the lower portion of the shaft threadedly engage the adjacent portion of the relatively fixed frame so that the vertical relationship between the carried part and the cooperating part may be easily adjusted. Once the adjusted position has been set, the shaft is easily locked in position by a locking disc carried by the threads by merely being tightened against the adjacent portion of the frame. With this arrangement, the carried part and the cooperating part may be set for the required cooperation by an infinite type adjustment to replace the conventional type of adjustment heretofore known for use with the spindle bars that included the tedious and time consuming proposition of selecting and using the required combination of shims under each bar Importantly, the construction of the adjustable pivot type support of the present invention is simple and is thus very low in cost so that it can reasonably be utilized for the individual support bars rather than merely for the doffer plate assembly or the spindle bar carrying drum. One example of an adjustable arrangement for the doffer assembly is shown in the patent to Hubbard 3,014,332, issued Dec. 26, 1961. With the spindle bars of each drum of the machine being each individually positionable with respect to their common doffer, a more exact operating relationship can be gained between the spindles and the depending wipers of the doffer plates. This is true since as will be realized the position of each of the support bars with respect to the doffer assembly may be different due to the changes which occur in the frame during operation, as mentioned above, and because of the manufacturing tolerances which are built into the machine.

In accordance with a related aspect of the present invention, the structure is designed so that the manipulation of the adjustment and locking means of the machine to gain adjustment of the individual support bars can usually be carried out by the unskilled operator and with no assistance. Furthermore, it has been found that the adjustment of all of the spindle bars can normally take place in substantially the same amount of time that was previously used to adjust the doffer assembly alone, since no compromise between the highest and lowest spindle bars need be made but each spindle bar is merely set as required.

In the preferred embodiment of the invention shown, the adjustment of the shaft is performed from underneath of the spindle bar support drum by engagement of a tool with a suitable formation on the lower face of the shaft. Advantageously, the locking operation may be performed while holding the shaft in the desired position by operating the locking disc with a suitable tool held in the other hand whereby a high degree of accuracy can be realized. The locking disc may be placed either on the opposite side of the lower support plate of the drum (as shown) or the near side, as is desired or convenient.

In an alternative embodiment of the adjustable support shaft of the present invention, a roller bearing is included between opposed shoulders of the shaft and the cooperating sleeve so that wear is held to a minimum and larger loads can be supported. In this arrangement, provision is made for receiving a small amount of lubricating oil from the driving gear system to insure minimum friction and wear. This alternative embodiment of the apparatus of the present invention is deemed to be capable of supporting the complete drum assembly with the series of spindle bars thereon as well as the complete doffer plate assembly if desired, in addition to it being of particular advantage in supporting the spindle bars themselves, as described herein.

Still other objects and advantages of the present invention will become readily apparent to those skilled in this art from the following detailed description, wherein I have shown and described only the preferred embodiments of the invention, simply by way of illustration of the best modes contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

In the drawings:

FIGURE 1 is an overall view of the portion of a cotton harvesting machine to which the present invention applies;

FIGURE 2 is a side view of the pivot support of the present invention partially in cross section for clarity;

FIGURE 3 is a bottom view of the pivot support of FIGURE 2;

FIGURE 4 is a side view of an alternative embodiment of the present invention partially in cross section to clearly show the internal parts of the same; and FIGURE 5 is a bottom view of the pivot support shown in FIGURE 4.

Referring now specifically to FIGURE 1 of the drawings, there is illustrated a section of a cotton harvesting machine to which the device of the present invention may be applied. In particular, there is shown a picking drum assembly 10 which is operative to pick the cotton bolls from the plants as the machine as a whole moves through the rows of plants. For purposes of illustrating the apparatus of the present invention, the drum assembly 10 comprises a hub 11 which is journaled for rotation in an upper frame member 12 by a support shaft 13; said drum assembly 10 being supported from below on a shouldered pivot stub shaft 14 by a bearing 15. This pivot shaft 14 is suitably mounted on a lower base or frame member 16 by any number of suitable bolts 17. The drum assembly 10 further includes upper and lower flange plates 18, 19 attached to the hub 11 by suitable peripheral welds, as shown in this figure.

The upper and lower flange plates 18, 19 serve to mount a plurality of spindle support bars 20 (only one of which is shown in FIGURE 1), which bar 20 extends vertically and serves to support a number of horizontally extending spindles 21. As indicated in FIGURE 1, each spindle 21 has a roughened surface 22 and they are adapted to be rotated in unison about their longitudinal axis so that as the cotton plants are passed by the movement of the machine, the cotton becomes attached to said surfaces 22 to effect the picking operation. The drive for each of the spindles is or may be of conventional construction and has been schematically represented in FIGURE 1 as a common drive shaft 23 extending along the length of the bar 20 with mating bevel gears 24, 24a for one of the spindles 21.

The spindles 21 have associated therewith a plurality of doffer plates 25 that are mounted on a common driven shaft 27 such that depending wipers 26 on the plates 25 are periodically moved across the horizontal upper surface of the spindles 21 to remove the cotton. The machine of FIGURE 1 operates through its cycle to pick the cotton and then remove it, by rotation of the complete drum assembly 10 in the direction indicated by arrow adjacent the shaft 13 so as to carry each bar 20 in succession past the picking and doffing stations, respectively. Each bar 20 is in addition, oscillated about its longitudinal axis by a closed cam 28 in response to this driving action of the support shaft 13 in order for the spindles 21 to negotiate through the framework of the machine. To do this, there is provided a cam follower 29 carried on the upper end of a lever arm 30, which in turn is operatively connected to the upper reduced end portion of the bar 20 by a suitable set screw 31. All of the foregoing machine structure can for all practical purposes be considered to be conventional and has been seen set forth herein merely to describe the environment in which the device of the present invention pertains and is not intended to be specifically limiting since, as will be clear from the following description, the inventive device can be used with other cotton harvesting machines with equal advantages, if desired.

Thus, in accordance with the teachings of the present invention, there is shown in FIGURES 2 and 3 a detailed view of the novel pivot support for the bar 20 (FIGURE 1), which support comprises an upright stub shaft, generally designated by the reference numeral 40. The top or bearing portion 41 of said shaft 40 cooperates with a bearing sleeve 42, which is preferably force fitted into the lower end of the bar 20. The bearing sleeve 42 has a depending radially extending skirt 43 which cooperates with a peripheral flange 44 on the shaft 40 to support the weight of the bar 20 (see FIGURE 1). The lower portion of the support shaft 40 is formed with screw threads 45 which are adapted to threadedly engage a tapped aperture in the lower support plate 19. A locking disc 46 is carried by the screw threads 45 and can be positioned on either side of the lower support plate 19 to securely clamp the shaft 40 into position when the desired adjustment has been reached. It should be noted that if any looseness or play is present between the threads 45 and the mating aperture, as sometimes occurs after extended use of the machine, it may be preferable to position the locking disc on the underside of the lower support plate 19 (opposite to that shown in FIGURE 1) so that the weight of the bar 20 will normally position the shaft 40 in the final adjusted position so that it can be locked in position without lost motion.

As can be seen in FIGURE 3, the lower end face 50 of the support shaft 40 is formed with an hexagonal opening 51 to receive a conventional tool of the Allen wrench type so that the shaft 40 may be adjustably turned without engagement of any operative surface of the same. The locking disc 46 may be provided with a series of tool engaging indentations 47 around its periphery and an opening 55 may be formed in the lower frame member 16 for access to said shaft 40 to permit the adjusting operation to be easily performed.

From the foregoing, this adjusting operation of the improved pivot shaft of the present invention should now be realized by those skilled in the art. Specifically, with reference to FIGURE 1, assuming that the set screw 31 has been loosened to permit free vertical movement of the bar 20, the operator engages the tool opening 51 in the support shaft 40 with a tool in one hand, and the indentations 47 of the locking disc 46 with another tool in the other hand. First, the locking disc 46 is loosened or backed away from the support or flange plate 19 whereupon the support shaft 40 may be raised and lowered with respect to the frame of the machine, which in this case is comprised in part by the lower flange plate 19. The proper adjusted position may be conveniently determined from observation of the relationship between the spindles 21 and the depending wipers 26 of the doffer plates 25 while the adjustment is being made. For example, if the wipers 26 are spaced too far from the spindles 21, which would incidentally cause a loss in removal efficiency of the cotton at the doffing station, the shaft 40 would be turned to raise the bar 20 until the spindles 21 are just engaging the wipers 26; whereas, if the wipers 26 are bearing too heavily on the spindles 21, the bar 20 would be, of course, lowered to prevent undue wear of said wipers 26. Once the desired adjustment has been made, the locking disc is simply returned to the locked position jammed against the support plate 19 while the operator still holds the support shaft 40 in position. The lever arm 30 is once again locked to the bar 20 by the set screw 31 and the drum assembly 10 may then be rotated to bring the next bar 20 into position for adjustment in the same manner and so on until all of the individual bars have been set.

The alternative embodiment shown in FIGURES 4 and 5 of the drawings is designed to take heavier loads, and thus is particularly suited, for example, for supporting the entire drum assembly 10 in lieu of the pivot shaft 14 if an adjustment is desired at this point in the machine to give a composite adjustment of all of the bars 20 relative to the doffer plates 25. Similarly, this embodiment of the invention could be used for the same purpose by utilizing it as a support for the common shaft 27 of the doffing means; it being understood that these uses are in addition to its primary use as a pivot type support for the individual spindle bars 20. In these FIGURES 4 and 5, like indicia identify like parts of the embodiment illustrated in FIGURES 2 and 3 and the main distinction of the new embodiment resides in the provision of an axial bearing for supporting the weight of the bar 20, which bearing is generally designated by the reference numeral 59 in FIGURE 4. This axial bearing 59 is formed by suitable rollers 60 held between a peripheral shoulder 61 formed on the shaft 40 by a hard metal wear ring, and an opposed shoulder 62 on the sleeve 42. As in the first embodiment, the bearing sleeve 42 is thus mounted for rotative movement with relation to the shaft portion 41 but with less frictional resistance. To lubricate the bearing 59 residue oil from the gears 24, 24a is allowed to drip down the interior of the bars 20, through a protective filter screen 63 (FIGURE 4), thus providing a simple arrangement for insuring that said bearing 59 continues to operate smoothly. An O-ring 64 may be employed below the bearing 59 and directly above the depending skirt 43 to prevent excess loss of the oil and a felt washer 65 prevents the admission of foreign matter to this area.

In summarization, it can be seen that applicant has devised a particularly simple but effective pivot type support which allows an improved manner of adjustment of the spindle support bars 20 in relation to the doffing means of a cotton picking apparatus. The simplicity of the construction is advantageous as set forth above, not only to allow easy operation of the same but also to reduce the cost so that the supports are economically feasible in the machine. Furthermore, in regard to the alternative embodiment, it can be seen that a maximum bearing load can be supported and automatic lubrication of the bearing 59 is provided by utilizing the excess oil from the spindle driving system.

In this disclosure, there is shown and described only the preferred embodiments of the invention, but, as aforementioned, it is to be understood that the invention is capable of various changes or modifications within the scope of the inventive concept as expressed by the accompanying claims.

I claim:
1. In a cotton harvesting machine having frame means, vertically spaced spindles mounted on a support bar to pick the cotton, and corresponding doffing means for removing the same from said spindles, the improvement comprising adjustable supporting means for vertically positioning said sipndles relative to said doffing means including an upright shaft forming a pivot type support, screw threads on said shaft for adjusting the relative vertical relationship by threaded engagement with said frame means, and a locking disc carried by said threads for cooperation with said frame means, whereby said bar can be vertically adjusted and locked at an infinite number of positions for the required cooperation between said spindles and said doffing means.

2. The combination of claim 1 wherein said shaft includes tool receiving means formed in the end face of the threaded end of said shaft whereby said shaft may be adjusted without engagement of its operative surfaces.

3. The combination of claim 2 wherein is further provided a bearing sleeve rotatably carried on said shaft, a peripheral shoulder formed on said shaft and a corresponding shoulder formed on said sleeve member in opposed relationship thereto, and roller bearings positioned between said shoulders for allowing improved relative rotation therebetween.

4. The combination of claim 3 wherein said sleeve member is formed with an opening in the top for allowing entrance of oil to said bearings, screen means positioned across said opening to prevent the entrance of foreign matter O-ring means below the level of said roller bearings to retain the oil in the region of said bearings, and a felt washer positioned between said shaft and said sleeve below said O-ring means to prevent entrance of foreign matter to said O-ring means.

5. The combination of claim 3 wherein said peripheral shoulder on said shaft is formed by a washer of hard metal to resist wear.

6. A pivot type support for mounting individual support bars on the frame of a cotton harvesting machine, which bars have vertically spaced spindles to pick the cotton, comprising an upright shaft, screw threads formed on said shaft for threaded engagement with said frame for adjusting the vertical position of said bars, and means for locking the position of said shaft in relation to said frame, whereby each individual bar can be vertically adjusted and locked at an infinite number of positions for the required cooperation with the other parts of said machine.

7. The combination of claim 6 wherein said locking means comprises a locking disc carried by said threads for cooperation with said frame means.

8. The combination of claim 7 wherein said locking disc includes tool engaging means around the periphery thereof and said shaft includes a tool receiving opening formed in the lower face thereof whereby the respective locking and adjustment functions may be carried out.

9. The combination of claim 6 wherein said shaft includes a pheripheral flange formed immediately above said threads, and a bearing sleeve having an opposed peripheral skirt for engagement with said flange on said shaft for cooperation therewith for receiving the bearing load of said support bars and for determining the vertical position of the same.

10. The combination of claim 6 wherein is further provided a peripheral shoulder adjacent the top of said shaft, a peripheral shoulder formed on said sleeve and in opposed relationship to said shoulder on said shaft and roller bearing means positioned between said shoulders for supporting endwise thrust between said sleeve and said shaft.

References Cited

UNITED STATES PATENTS

| 2,664,688 | 1/1954 | Nickla | 56—41 |
| 2,664,689 | 1/1954 | Walker et al. | 56—41 |
| 2,723,520 | 11/1955 | Hubbard | 56—47 |
| 2,767,542 | 10/1956 | Bopf | 56—47 |
| 3,014,332 | 12/1961 | Hubbard | 56—41 |
| 3,035,389 | 5/1962 | Sadler et al. | 56—44 |

RUSSELL R. KINSEY, Primary Examiner